US010754205B2

(12) United States Patent
Metin et al.

(10) Patent No.: US 10,754,205 B2
(45) Date of Patent: Aug. 25, 2020

(54) VACUUM IMPREGNATION SEAL IN AN ELECTRONIC DEVICE

(71) Applicant: Apple Inc., Cupertino, CA (US)

(72) Inventors: Burak Metin, San Jose, CA (US); Logan M. Ames, Palo Alto, CA (US); HaiLong Wang, Shanghai (CN); Ricky C. Lee, Arcadia, CA (US); Duy P. Le, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 16/041,591

(22) Filed: Jul. 20, 2018

(65) Prior Publication Data
US 2020/0026108 A1 Jan. 23, 2020

(51) Int. Cl.
*G02F 1/1341* (2006.01)
*G02F 1/1339* (2006.01)
*G06F 1/16* (2006.01)
*C09J 5/00* (2006.01)
*B29C 45/14* (2006.01)

(52) U.S. Cl.
CPC ........ *G02F 1/1341* (2013.01); *G02F 1/13394* (2013.01); *B29C 45/14311* (2013.01); *C09J 5/00* (2013.01); *G06F 1/1684* (2013.01)

(58) Field of Classification Search
CPC .................................................. G02F 1/1341
See application file for complete search history.

(56) References Cited

U.S. PATENT DOCUMENTS

| 5,365,356 A | 11/1994 | McFadden | |
|---|---|---|---|
| 2002/0066519 A1* | 6/2002 | Polis | C03C 27/10 156/89.15 |
| 2006/0273431 A1* | 12/2006 | He | H01L 23/53228 257/632 |
| 2008/0295932 A1* | 12/2008 | Havens | H05K 5/0086 150/154 |
| 2009/0218041 A1 | 9/2009 | Dean et al. | |

(Continued)

OTHER PUBLICATIONS

Amazon: "Ogodeal Screen Adhesive Strips for iPhone 8 Pre-Cut Waterproof Seals Adhesive 2 Pack", https://www.amazon.com/Ogodeal-Adhesive-Waterproof-Stickers-Replacement/dp/B077HN6LS1 pulled Jun. 13, 2018.

*Primary Examiner* — Sang V Nguyen
(74) *Attorney, Agent, or Firm* — Dorsey & Whitney LLP

(57) ABSTRACT

An electronic device is disclosed. The electronic device may include an enclosure that includes a metal band and a wall. The electronic device may further include a filler compound positioned in an opening of the metal band, where a split between two sidewall components defines the opening. The filler compound provides an RF communication path through the enclosure. In order to reduce or prevent liquid ingress into the enclosure, the electronic device may include a sealing compound that infused into the opening between the filler compound and the sidewall components, thereby providing a seal. The infusion process including placing the metal band (with the filler compound) in a chamber, providing a vacuum to remove air between the metal band and the filler compound, and subsequently providing a positive pressure to force the sealing compound between the metal band and the filler compound. The sealing compound may include an adhesive.

19 Claims, 10 Drawing Sheets

(56) References Cited

U.S. PATENT DOCUMENTS

| | | | |
|---|---|---|---|
| 2011/0076883 A1* | 3/2011 | Jol | H01R 43/24 439/521 |
| 2013/0075941 A1 | 3/2013 | Chang et al. | |
| 2014/0239781 A1* | 8/2014 | Allore | B29C 45/14434 312/223.1 |
| 2015/0093527 A1* | 4/2015 | Montevirgen | B29C 45/14467 428/35.7 |
| 2016/0070393 A1* | 3/2016 | Sharma | A61B 5/002 345/174 |
| 2016/0118296 A1* | 4/2016 | Kolics | H01L 21/76879 438/653 |
| 2016/0357268 A1* | 12/2016 | Alameh | G06F 1/1684 |
| 2017/0069956 A1* | 3/2017 | Hill | H01Q 1/243 |
| 2017/0160766 A1* | 6/2017 | Gupta | G06F 1/1605 |

\* cited by examiner

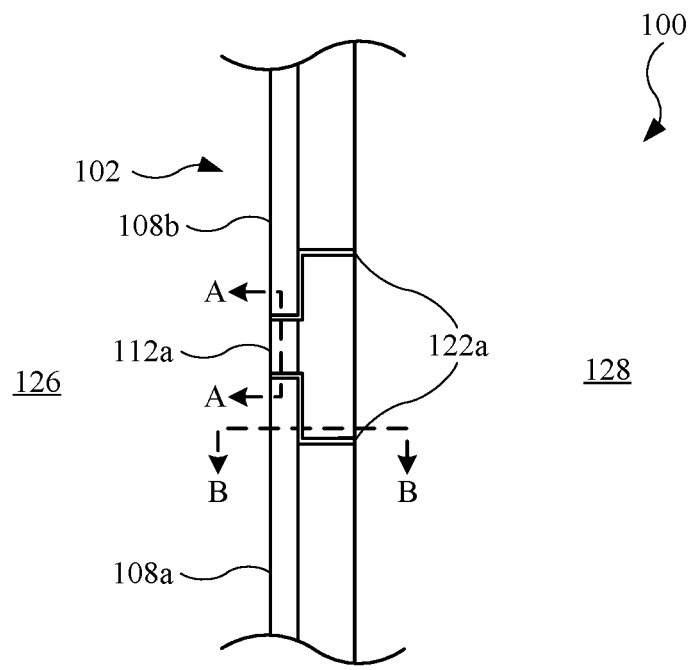
FIG. 4
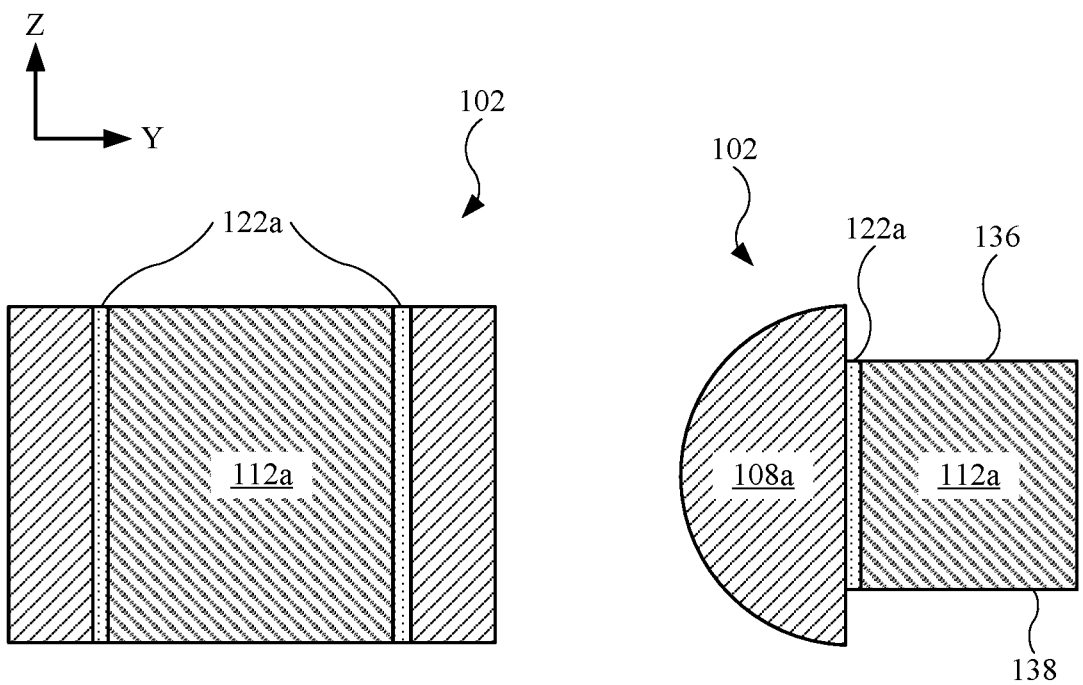
FIG. 5
FIG. 6

VACUUM IMPREGNATION SEAL IN AN ELECTRONIC DEVICE

FIELD

The following description relates to electronic devices. In particular, the following description relates to infusing a sealing compound in gaps between housing parts of the electronic device. The sealing compound can create a seal against liquid ingress into the electronic device.

BACKGROUND

Electronic devices are known to include multiple components that combine to form a housing. Current electronic devices may include wireless communication capabilities, which require antennae disposed in the housing. When an electronic device with wireless communication capabilities includes a housing with metal, the housing also requires a non-metal material that permits radio frequency communication into and out of the housing.

When non-metals are used, the housing may include breaks or discontinuities. In order to prevent water from entering through the breaks, a coating can be applied to the housing at the breaks. However, in order to limit the volume or space occupied by the coating in the housing, the coating may be relatively thin. This can lead to early breakdown. As a result, the electronic device is again susceptible to water ingress at the breaks.

SUMMARY

In one aspect, a portable electronic device is described. The portable electronic device may include a wall. The portable electronic device may further include a band that includes an opening. The band may combine with the wall to define an internal volume. The portable electronic device may further include a filler compound positioned in the opening. The filler compound and the band may define a gap. The portable electronic device may further include a sealing compound infused into the gap. The sealing compound may define a barrier that prevents a liquid from entering the internal volume through the gap.

In another aspect, a portable electronic device is described. The portable electronic device may include a metal band that includes a first surface and a second surface opposite the first surface. The metal band may further include an opening. The portable electronic device may further include a filler compound positioned in the opening. The filler compound and the metal band may define a gap. The portable electronic device may further include a transparent protective layer that coupled with the metal band to define an internal volume. The portable electronic device may further include a sealing compound infused in the gap. The sealing compound may extend from the first surface to the second surface. In some embodiments, the sealing compound may adhere to the metal band and the filler compound to form a barrier that prevents a liquid from entering the internal volume through the gap.

In another aspect, a method for assembling a portable electronic device is described. The portable electronic device may include a metal band and a filler compound. The method may include immersing the metal band and the filler compound in a sealing compound. The sealing compound can be disposed in a chamber. The method may further include reducing air pressure, by removing air, in the chamber from a first pressure to a second pressure less than the first pressure. Reducing the air pressure to the second pressure may expel entrained air in a gap between the metal band and the filler compound. The method may further include increasing the air pressure, by providing air, in the chamber from the second pressure to a third pressure greater than the second pressure. Increasing the air pressure to the third pressure may cause the sealing compound to infuse into the gap. In some instances, the third pressure can be equal to (or approximately to) atmospheric pressure. Further, in some instances, the third pressure can be greater than atmospheric pressure.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 4 illustrates a plan view of the electronic device shown in FIG. 1, showing the filler compound positioned in the opening of the band and the sealing compound positioned between the band and the filler compound.

FIG. 5 illustrates a cross sectional view of the band shown in FIG. 4, taken along line A-A, showing the sealing compound surrounding the filler compound.

FIG. 6 illustrates a cross sectional view of the band shown in FIG. 4, taken along line B-B, showing the sealing compound infused between the band and the filler compound.

Figure 1:
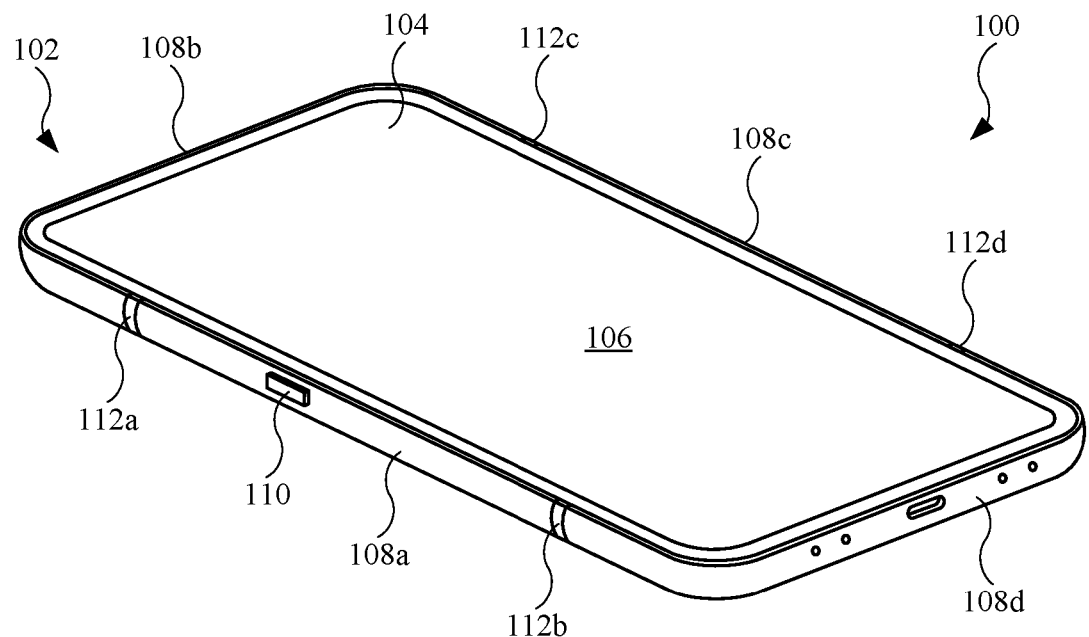
FIG. 1 illustrates an isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an enhanced sealing technique for electronic devices to limit or prevent liquid from entering an electronic device. Electronic devices described herein may include a sealing compound that is impregnated, or infused, into an enclosure, or housing, of the electronic device. The infusion point may include a gap between two components of the enclosure that are joined together. For example, the enclosure may include several sidewall components that combine to form a metal band, with the sidewall components separated by openings. A filler compound may fill the openings between adjacent sidewall components. The filler compound may include plastic, resin, or other similar material. Although relatively small, a gap forms between the sidewall components (of the metal band) and the filler compound. However, the sealing compound can be infused into the gaps, and the metal band is shielded, at the gaps, from liquid ingress.

In order to infuse the sealing compound into the gaps, several operations may be performed on the metal band. For instance, the metal band (with the filler compounds included) may be placed in a chamber that filled with the sealing compound. The chamber can undergo a vacuum, or negative pressure, operation to expel entrained air in the gaps. In a subsequent operation, the pressure in the chamber is increased. The increased pressure forces the sealing material to enter and fill the gaps. The metal bands can then be unloaded from the chamber. In some instances, the metal bands undergo a cleaning operation to remove excess sealing material. Also, in some instances, the metal bands undergo a masking operation that includes application of a film to the metal bands. The may promote the cleaning operation. The metal bands may further undergo a curing operation in order to solidify the sealing material.

By sealing the gaps, the electronic device may significantly reduce the likelihood of liquid ingress. Also, by providing an enclosure with a substantially metal band with select locations of non-metal filler compounds, the electronic device includes a robust enclosure while allowing for transmission of radio frequency ("RF") communication.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with some described embodiments. In some embodiments, the electronic device 100 includes a wearable electronic device (such as a "smart watch") or a laptop computing device. In the embodiment shown in FIG. 1, the electronic device 100 is a mobile wireless communication device, such as a smartphone.

As shown, the electronic device 100 may include a band 102 that defines a perimeter of the electronic device 100. The band 102 may include a metal band formed from steel (including stainless steel), aluminum, or a metal alloy that includes several metals, including (but not limited to) aluminum, steel, and/or nickel. The electronic device 100 may further include a display assembly 104 formed from multiple layers, which may include a capacitive touch input layer, a display layer that presents visual information, and a force detection layer that detects an amount of force applied to the display assembly 104. The electronic device 100 may further include a transparent protective layer 106 that covers the display assembly 104. The transparent protective layer 106 may include glass, sapphire, plastic, or the like. Although not shown, the electronic device 100 may further include an additional transparent protective layer. The transparent protective layer 106 shown in FIG. 1 is coupled to a front section of the band 102, while the additional transparent protective layer (not shown in FIG. 1) is coupled to a back section of the band 102. Also, the transparent protective layer 106, the band 102, and the additional transparent protective layer can combine to form an internal volume used by the electronic device 100 to store circuit boards, processor circuits, memory circuits, flexible cables, battery, audio speakers, microphone, etc., as non-limiting examples. In addition to the touch input layer and the force detection layer, the electronic device 100 may further include additional input mechanisms, including a button 110 designed to actuate a switch (not shown in FIG. 1). Although not shown, the electronic device 100 may include additional buttons and switches in various locations along the band 102.

The band 102 may include several sidewall components. For example, the band 102 may include a sidewall component 108a, a sidewall component 108b, a sidewall component 108c, and a sidewall component 108d. Each sidewall component can be separated from adjacent sidewall components by an opening. Further, each opening is filled with a filler compound. As shown in FIG. 1, a filler compound 112a occupies an opening, or separation, between the sidewall component 108a from the sidewall component 108b. A filler compound 112b occupies an opening between the sidewall component 108a from the sidewall component 108d. A filler compound 112c occupies an opening between the sidewall component 108b from the sidewall component 108c. A filler compound 112d occupies an opening between the sidewall component 108c from the sidewall component 108d. The filler compounds may include a non-metal material (or materials), including plastic, resin, and/or an adhesive. However, other filler compounds are possible. Also, the filler compounds may be molded to the sidewall components by a molding operation, which may include compression molding, injection molding, or the like. However, other operations can be used. In order to prevent or limit liquid ingress into the internal volume of the electronic device 100, a sealing compound may be infused into gaps, or spaces, between the filler compounds and the sidewall components. This will be further shown and described below.

Figure 2:
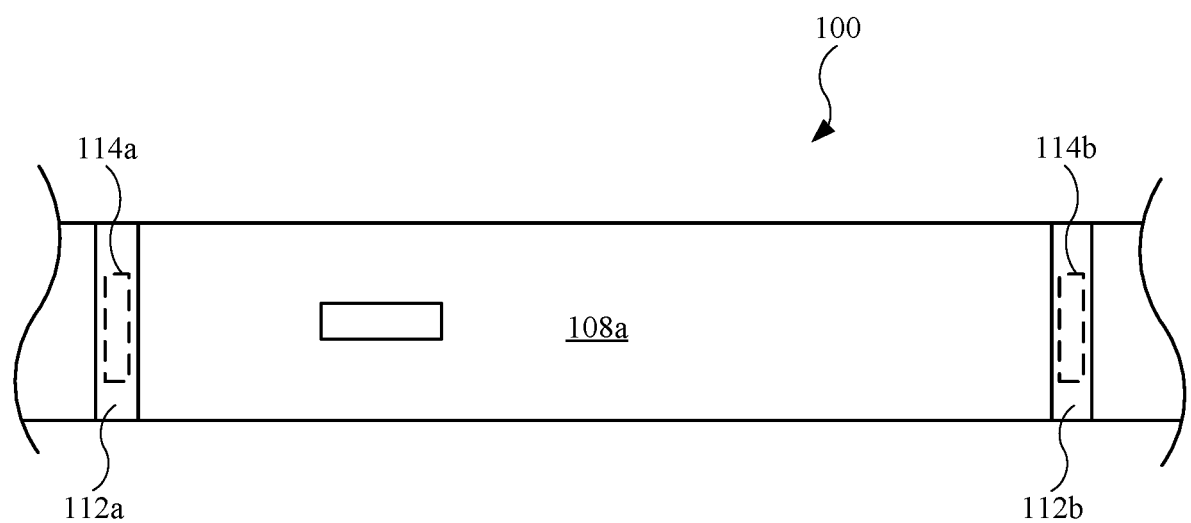
FIG. 2 illustrates a side view of the electronic device shown in FIG. 1, further showing wireless communication components of the electronic device.

The filler compounds are designed to provide non-metal portion between the metal sidewall components. In this manner, the electronic device 100 may include RF communication components (such as antennae) disposed in the internal volume at locations corresponding to the filler compounds. For example, FIG. 2 illustrates a side view of the electronic device 100 shown in FIG. 1, further showing wireless communication components of the electronic device 100. As shown, the electronic device 100 may include a wireless component 114a (shown as a dotted line) covered by the filler compound 112a. The electronic device 100 may further include a wireless component 114b (shown as a dotted line) covered by the filler compound 112b. The aforementioned wireless components may include an antenna designed to transmit and receive RF communication signals, include Wi-Fi, Bluetooth®, and cellular network signals. The wireless components are shown along the sidewall component 108a. However, additional wireless components may be positioned along the sidewall component 108c (shown in FIG. 1) and covered by the filler compound 112c and the filler compound 112d (both shown in FIG. 1).

Figure 3:
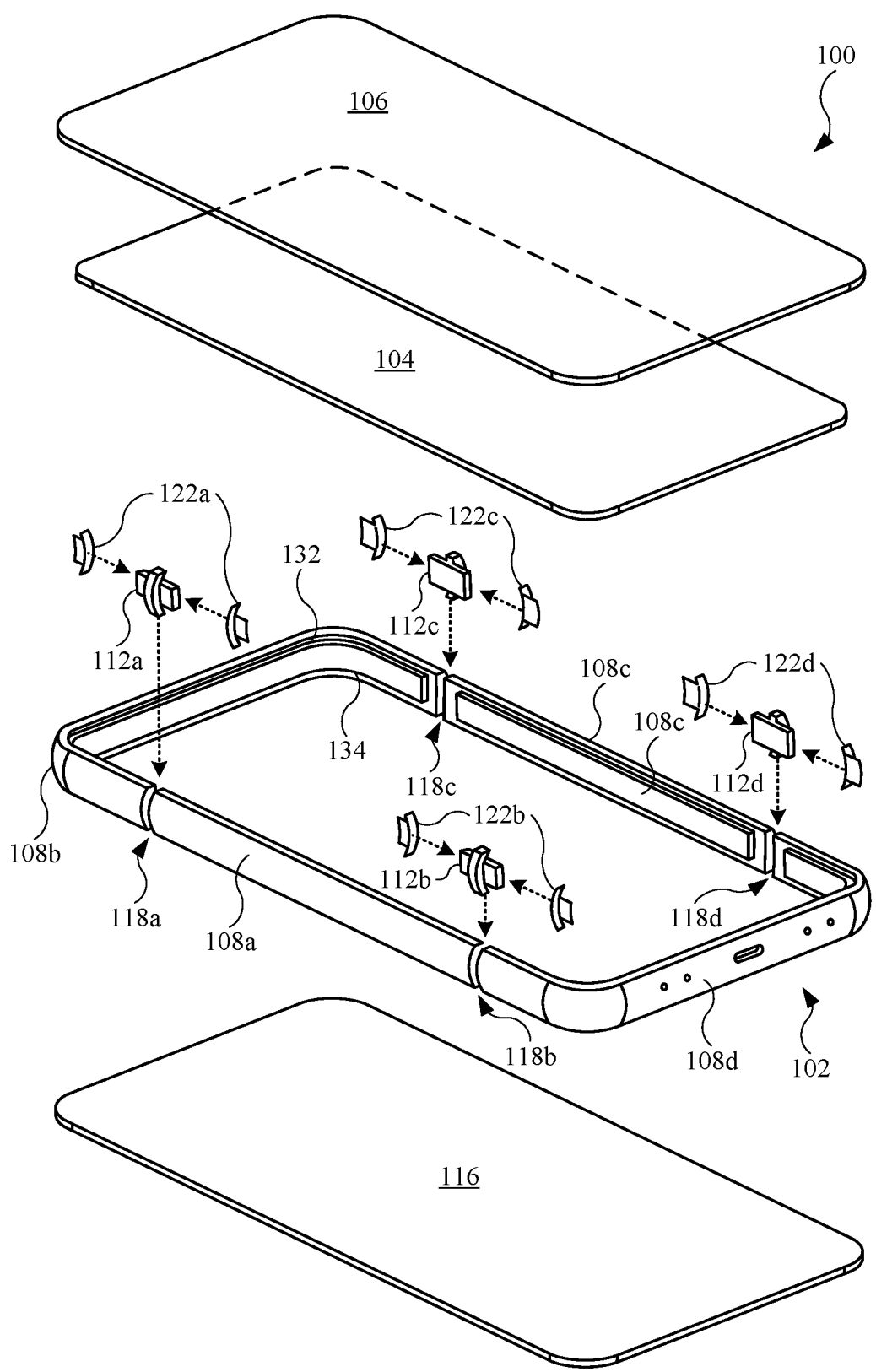
FIG. 3 illustrates an exploded view of the electronic device shown in FIG. 1.

FIG. 3 illustrates an exploded view of the electronic device 100 shown in FIG. 1. For purposes of simplicity, several internal components are removed. As shown, the electronic device 100 includes a transparent protective layer 106 designed to cover the display assembly 104. The electronic device 100 may further include a transparent protective layer 116 (corresponding to the additional transparent layer referred to in FIG. 1) used as a wall of the electronic device 100.

Adjacent sidewall components are separated by openings, or split regions. For example, the sidewall component 108a is separated from the sidewall component 108b by an opening 118a. The sidewall component 108a is separated from the sidewall component 108d by an opening 118b. The sidewall component 108b is separated from the sidewall component 108c by an opening 118c. The sidewall component 108c is separated from the sidewall component 108d by an opening 118d. A filler compound may file each of the openings through one of the aforementioned molding operations. For example, the filler compound 112a can fill the opening 118a, the filler compound 112b can fill the opening 118b, the filler compound 112c can fill the opening 118c, and the filler compound 112d can fill the opening 118d.

When the filler compounds are positioned in their respective openings, a small gap may nonetheless exist between the sidewall components and the filler compounds. These gaps may be 100 micrometers or less. In some instances, these gaps may be 50 micrometers or less. In order to plug these gaps and prevent ingress of contaminants through the band 102, a sealing compound may be infused into the gaps. For example, a sealing compound 122a can be infused in a gap formed between the sidewall component 108a and the filler compound 112a, as well as a gap formed between the sidewall component 108b and the filler compound 112a. A sealing compound 122b can be infused in a gap formed between the sidewall component 108a and the filler compound 112b, as well as a gap formed between the sidewall component 108d and the filler compound 112b. A sealing compound 122c can be infused in a gap formed between the sidewall component 108b and the filler compound 112c, as well as a gap formed between the sidewall component 108c and the filler compound 112c. A sealing compound 122d can be infused in a gap formed between the sidewall component 108c and the filler compound 112d, as well as a gap formed between the sidewall component 108d and the filler compound 112d.

The sealing compounds are designed to seal the gaps between the filler compounds and the sidewall compounds. In this manner, unwanted ingress through the band 102 is prevented or substantially limited. Also, the sealing compounds may provide a bond between the filler compounds and the sidewall components, thereby maintaining a desired engagement between the filler compounds and the sidewall components.

FIGS. 4-6 shows and describes the relationship between the filler compound 112a, the sealing compound 122a, and the band 102. While not shown and described in detail, the remaining filler compounds and sealing compounds shown and described in FIG. 3 may include similar relationships to that which is shown and described in FIGS. 4-6.

FIG. 4 illustrates a plan view of the electronic device 100 shown in FIG. 1, showing the filler compound 112a positioned in the opening 118a of the band 102 and the sealing compound 122a positioned between the band 102 and the filler compound 112a. For purposes of illustration, the gap between the band 102 and the filler compound 112a is enlarged and exaggerated to show the position of the sealing compound 122a. As shown, the sealing compound 122a may extend between the sidewall component 108a and the filler compound 112a, as well as between the sidewall component 108b and the filler compound 112a. Further, the sealing compound 122a may extend from an exterior surface of the band 102 (which include the sidewall components) to an interior surface of the band 102. The "exterior surface" may be associated with a surface exposed to an external environment 126, while the "interior surface" may be associated with a surface exposed to an internal volume 128 of the electronic device 100.

FIG. 5 illustrates a cross sectional view of the band 102 shown in FIG. 4, taken along line A-A, showing the sealing compound 122a surrounding the filler compound 112a. As shown, the sealing compound 122a may extend lengthwise (along the Z-dimension) from opposing edges of the filler compound 112a. FIG. 6 illustrates a cross sectional view of the band 102 shown in FIG. 4, taken along line B-B, showing the sealing compound 122a infused between the band 102 and the filler compound 112a. As shown, the sealing compound 122a can extend around the filler compound 112a to a location between the sidewall component 108a and the filler compound 112a. Based upon the locations of the sealing compound 122a, as shown in FIGS. 4-6, the sealing compound 122a can flow in multiple directions, including perpendicular directions. Referring again to FIG. 3, the band 102 may define platforms, include a platform 132 and a platform 134, designed to receive the transparent protective layer 106 and the transparent protective layer 116, respectively. The platforms may include breaks or discontinuities in location corresponding to the openings. However, the filler compounds may be used to bridge the discontinuities. For example, the filler compound 112a define a platform section 136 and a platform section 138 that is flush, or co-planar, with respect to the platform 132 and the platform 134, respectively, shown in FIG. 3. Further, the platform section 136 and the platform section 138 can provide a continuous, or at least substantially continuous, platform for the aforementioned transparent protective layers.

Figure 7:
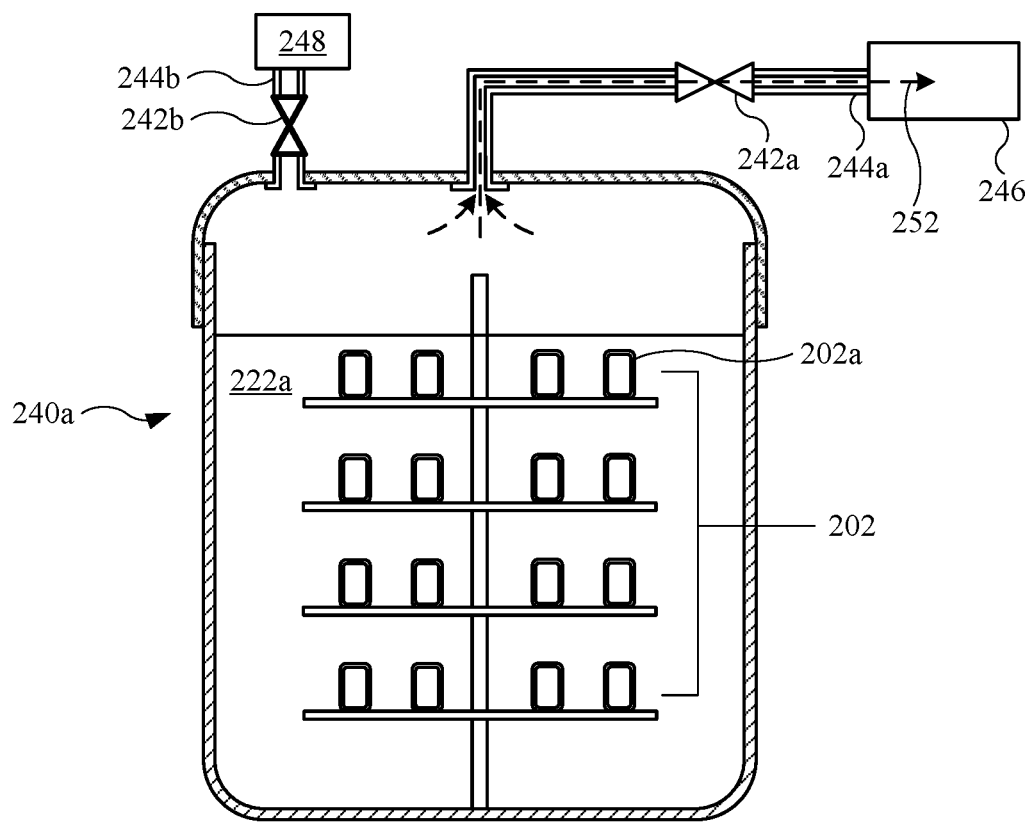
FIG. 7 illustrates a partial cross sectional view of a chamber that contains a sealing compound, showing several bands disposed in the chamber and immersed in the sealing compound, in accordance with some described embodiments.

FIGS. 7-12 show processes used to infuse or impregnate the sealing compound into a band of an electronic device. Some processes may be optional processes. FIG. 7 illustrates a partial cross sectional view of a chamber 240a that contains a sealing compound 222a, showing bands 202 disposed in the chamber 240a and immersed in the sealing compound 222a, in accordance with some described embodiments. Each of the bands 202 may include any feature described herein for a band, including (but not limited to) stainless steel sidewall components and filler compounds. The bands 202 may include a band 202a that represents the remaining bands.

As shown, the sealing compound 222a is in liquid form at room temperature (approximately 20-25 degrees Celsius). The sealing compound 222a may include several materials. For example, the sealing compound 222a may include a water-based adhesive that includes glue and/or a polymer material(s) combined with water to form an adhesive suspension. The sealing compound 222a may further include an acrylic polymer suspension. Also, in some embodiments, the sealing compound 222a includes one or more surfactants designed to lower the surface tension of the sealing compound 222a, which may facilitate the infusion of the sealing compound 222a into the bands 202. The sealing compound 222a may further include epoxy, silicone, and/or organic materials. Also, the sealing compound 222a shown and described in FIG. 7 can be used in other embodiments of a sealing compound described herein.

When the bands 202 and the sealing compound 222a are in the chamber 240a, the chamber 240a can be configured as an airtight chamber. In order to regulate pressure in the chamber 240a, the chamber 240a can be connected to a valve 242a (via a pipe 244a) as well as a valve 242a (via a pipe 244b). The valve 242a and the pipe 244a can be connected to a vacuum 246, which may include a pump, capable removing air from the chamber 240a, thereby decreasing air pressure in the chamber 240a. The valve 242b and the pipe 244b can be connected to an air supply 248, which may include an air compressor, capable adding air to the chamber 240a, thereby increasing air pressure in the chamber 240a.

In FIG. 7, the valve 242a is open and the valve 242b is closed. Also, the vacuum 246 is removing air (denoted as dotted lines 252) from the chamber 240a. As the vacuum 246 removes air, the pressure in the chamber 240a decreases. As a result, air within in the bands 202 can also be expelled. This will be shown below. In some instances, air is removed from the chamber 240a to subject the bands 202 to an air pressure of 0.1 bar for 25 minutes. However, other pressures and times are possible. It should be noted that the air pressure should not be reduced to a pressure that causes cavitation within the bands 202.

Figure 8:
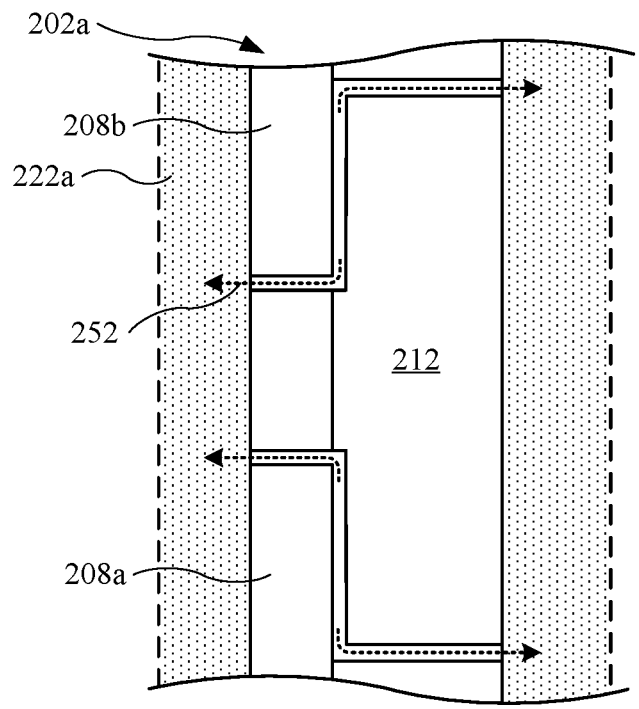
FIG. 8 illustrates a plan view of the band immersed in the chamber shown in FIG. 7, showing air exiting gaps between the band and the filler compound.

As a result of the reduced air pressure, entrained air within gaps between the filler compound and the sidewall components are forced out of the bands 202. For example, FIG. 8 illustrates a plan view of the band 202a immersed in the chamber 240a shown in FIG. 7, showing air exiting gaps between the band 202a and the filler compound 212. The air is represented by dotted lines 252. As shown, the air is exiting a gap between a sidewall component 208a and a filler compound 212, as well as a gap between a sidewall component 208b and the filler compound 212. The air expelled from the band 202a can pass through the sealing compound 222a and out of the chamber 240a (shown in FIG. 7). Removing air can facilitate infusion of the sealing compound 222a into the band 202a.

Figure 9:
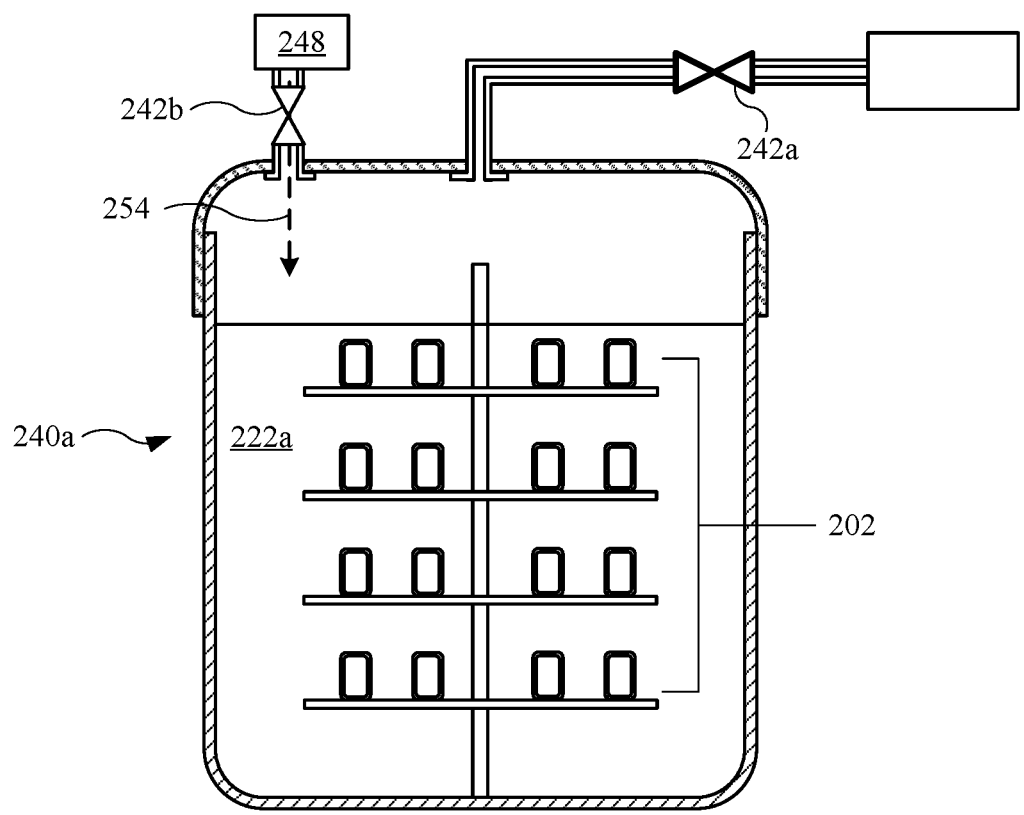
FIG. 9 illustrates a partial cross sectional view of the chamber shown in FIG. 7, showing the chamber undergoing a pressure increase.

When the air is removed to create a desired (reduced) air pressure in the chamber 240a for a sufficient period of time, the chamber 240a can subsequently begin receiving air to increase the air pressure. FIG. 9 illustrates a partial cross sectional view of the chamber 240a shown in FIG. 7, showing the chamber 240a undergoing a pressure increase. As shown, the valve 242b is open and the valve 242a is closed. The air supply 248 supplies air (shown as a dotted line 254) into the chamber 240a. As a result, the air pressure in the chamber 240a increases. In some instances, air is supplied to the chamber 240a to subject the bands 202 to an air pressure of 6 bar for 25 minutes. However, other pressures and time intervals are possible. For example, the pressure can be greater than atmospheric pressure, thereby promoting enhanced infusion into the bands 202. The enhanced fusion may include a reduce infusion time and/or greater penetration into the bands 202.

Figure 10:
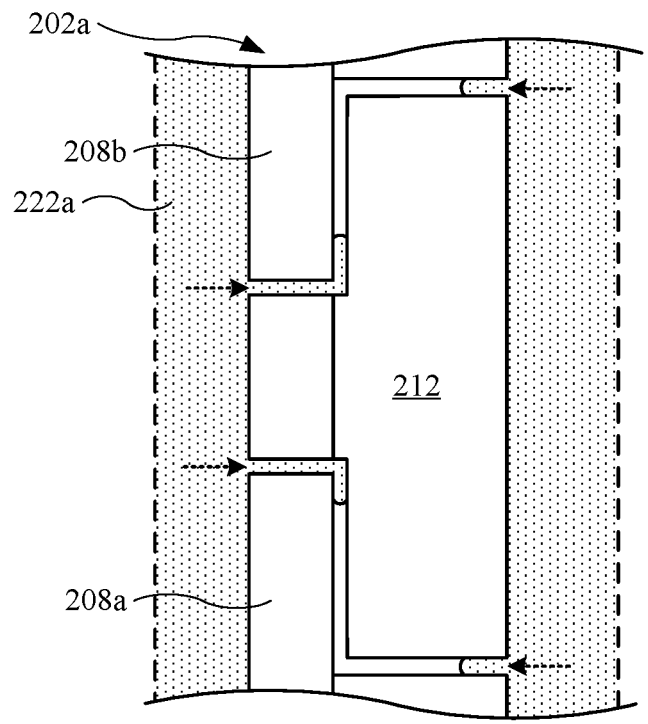
FIG. 10 illustrates a plan view of the band shown in FIG. 8, showing the sealing compound entering the gap between the band and the filler compound.

The increased pressure in the chamber 240a causes infusion of the sealing compound 222a into the gaps in the band 202a. For example, FIG. 10 illustrates a plan view of the band 202a shown in FIG. 8, showing the sealing compound 222a entering the gap between the band 202a and the filler compound 212. As shown, the sealing compound 222a has partially filled the gaps. However, after a sufficient time and pressure (such as 6 bar for 25 minutes) applied to the band 202a, the sealing compound 222a may fully fill the gap.

Figure 11:
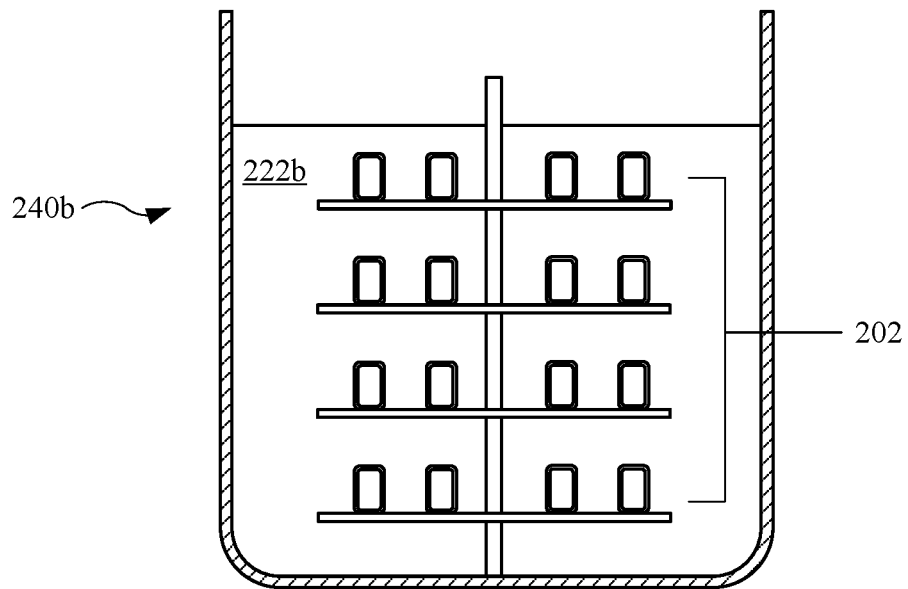
FIG. 11 illustrates a partial cross sectional view of the bands disposed in a second chamber that contains a sealing compound.

Subsequent to the infusion process, the sealing compound 222a that is left on the outside of the bands 202 as residue may be excess and unwanted. When this occurs, the bands 202 may undergo a cleaning operation. FIG. 11 illustrates a partial cross sectional view of the bands 202 disposed in a chamber 240b that contains a sealing compound 222b. The sealing compound 222b in the chamber 240b may include a diluted version of the sealing compound 222a (shown in FIGS. 7-10). In other words, the percent concentration of water in the sealing compound 222b is increased, as compared to the sealing compound 222a (shown in FIGS. 7-10). The sealing compound 222b is designed to at least partially remove the sealing compound 222a that is unwanted. For example, any of the sealing compound 222a that is on outer surface (i.e., not in the gaps) band 202a may be referred to as "unwanted" sealing compound. Also, although not shown, the bands 202 may further be placed in a chamber that includes water to further remove the sealing compound 222a that is excess. Also, in some instances, the bands 202 undergo a masking operation that includes application of a film to the bands 202. The masking operation may promote removal of excess sealing compound on the bands 202.

Figure 12:
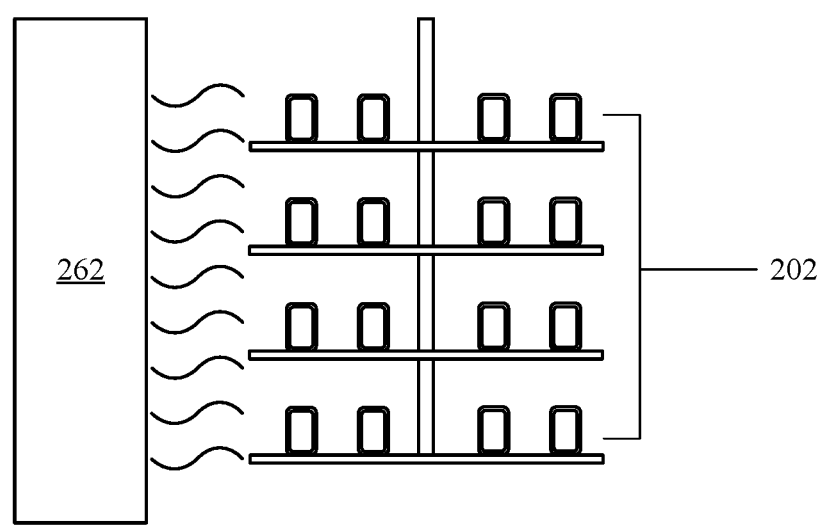
FIG. 12 illustrates a plan view of the bands undergoing a curing operation.

FIG. 12 illustrates a plan view of the bands 202 undergoing a curing operation. The curing operation may include a heating unit 262 that applies heat to solidify the sealing compound 222a (not labeled in FIG. 12). The heating unit 262 may apply heat at a temperature approximately in the range of 50 to 70 degrees Celsius for an hour. However, other temperatures and time intervals are possible.

Figure 13:
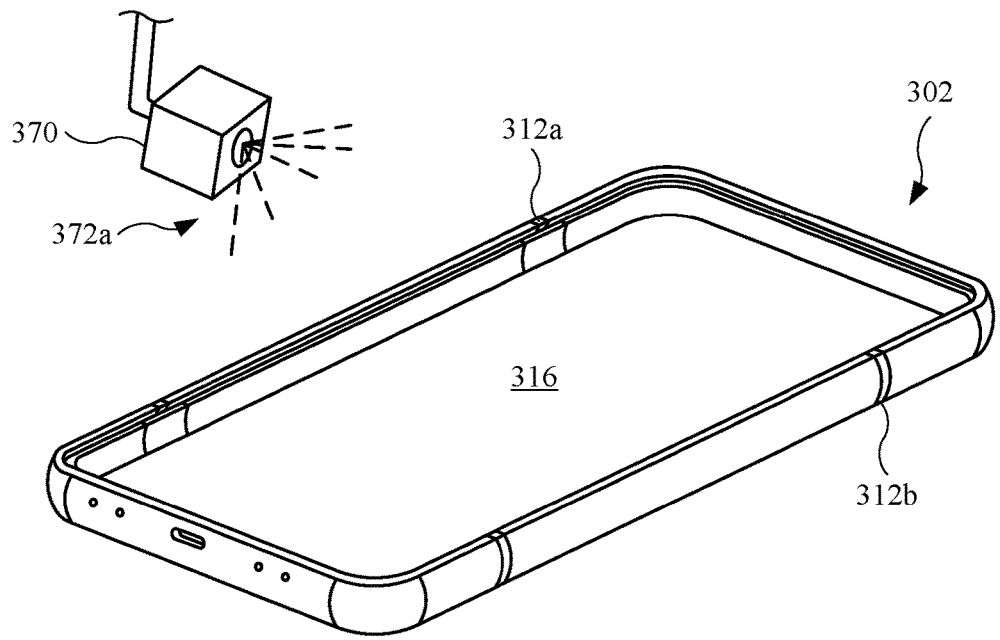
FIG. 13 illustrates an isometric view of an enclosure undergoing a coating operation, in accordance with some described embodiments.

After the sealing compound is infused into the bands, transparent protective layers (such as the transparent protective layer 116, shown in FIG. 3) can be coupled with the bands. Then, a coating operation can be applied to the bands and the transparent protective layers to provide an additional sealing layer that forms a shield against liquid ingress. FIG. 13 illustrates an isometric view of an enclosure undergoing a coating operation, in accordance with some described embodiments. As shown, a coating tool 370 applies a spray 372a to a band 302 and a transparent protective layer 316. It should be noted that band 302 and the transparent protective layer 316 can combine to form an enclosure for an electronic device. The spray 372a may include a material (or materials) including polyurethane, as a non-limiting example.

When applied, the spray 372a can cover the band 302 and the transparent protective layer 316. The spray 372a can further cover filler compounds, such as a filler compound 312a and a filler compound 312b, disposed in openings (between sidewall components) of the band 302. The spray 372a may further cover additional filler compounds (shown, not labeled).

Figure 14:
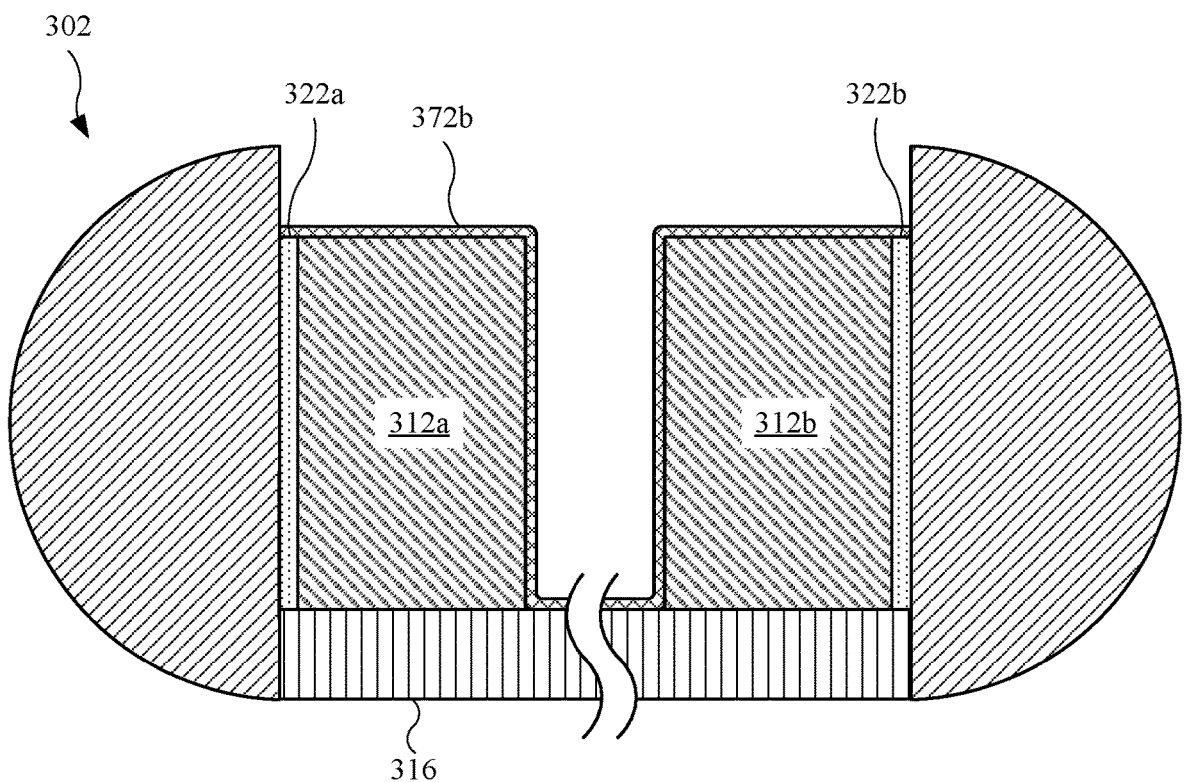
FIG. 14 illustrates a cross sectional view of the enclosure shown in FIG. 13, subsequent to the coating operation.

FIG. 14 illustrates a cross sectional view of the enclosure shown in FIG. 13, subsequent to the coating operation. As shown, a coating 372b (formed by the spray 372a in FIG. 13) covers the band 302 (including sidewall components), the filler compound 312a, the transparent protective layer 316, and the filler compound 312b. Further, the band 302 includes a sealing compound 322a between the band 302 and the filler compound 312a, as well as a sealing compound 322b between the band 302 and the filler compound 312b. The coating 372b may further cover the sealing compound 322a and the sealing compound 322b. In this manner, an electronic device that uses the band 302 and the transparent protective layer 316 may include multiple forms of ingress protection by the sealing compound 322a, sealing compound 322b, and the coating 372b. It should be noted that the coating 372b provides minimal, if any, RF interference.

In order to enhance the coupling between the filler compound and the sidewall components, the sidewall components may include recesses, or cavities, that extend partially into the sidewall components. As a result, when the filler compound is molded to the sidewall components, the filler compound extends into the recesses. Further, when the filler compound cures, the filler compound may mechanically interlock with the sidewall component based upon the cured portion of the filler compound within the recess of the sidewall component.

Figure 15:
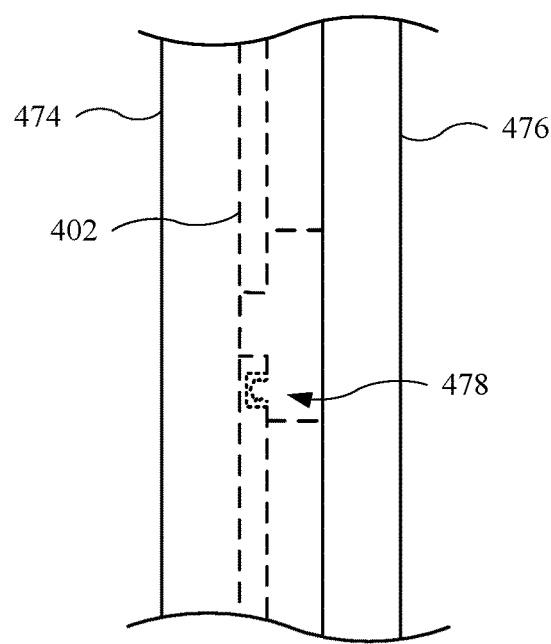
FIG. 15 illustrates a plan view of an embodiment of a band positioned in a molding device, in accordance with some described embodiments.

FIG. 15 illustrates a plan view of an embodiment of a band 402 positioned in a molding device, in accordance with some described embodiments. As shown, the molding device includes a first molding part 474 and a second molding part 476 that combines with the first molding part 474 to hold the band 402 (shown as dotted lines). The band 402 may include recesses 478, which will be further shown and described below. In the configuration shown in FIG. 15, the molding device can receive a filler compound (not shown in FIG. 15) through a molding operation.

Figure 16:
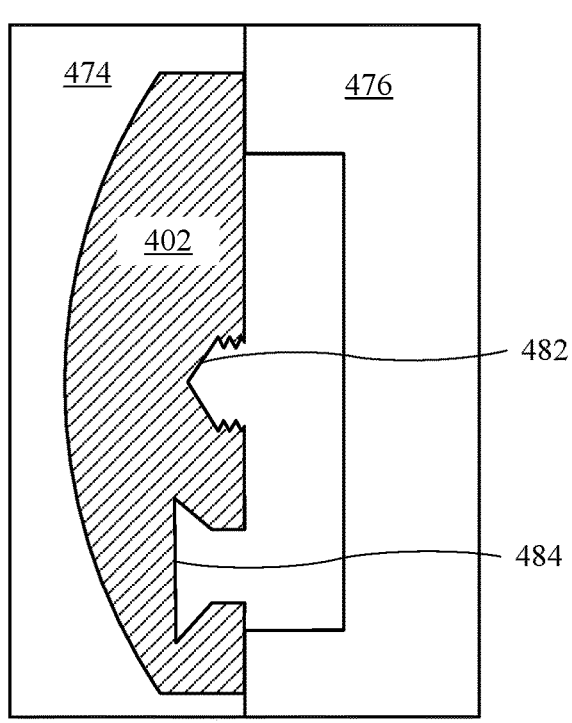
FIG. 16 illustrates a cross sectional view of the band and the molding device shown in FIG. 15.

FIG. 16 illustrates a cross sectional view of the band 402 and the molding device shown in FIG. 15. As shown, the band 402 may include a first recess 482 and a second recess 484. The first recess 482 may resemble a threaded fastener, while the second recess 484 may resemble a dovetail. However, it should be noted that other shapes of recesses are possible. When a filler compound (not shown in FIG. 16) is disposed between the first molding part 474 and the second molding part 476 by a molding operation, the filler compound will extend not only along the band 402, but into the first recess 482 and the second recess 484.

Figure 17:
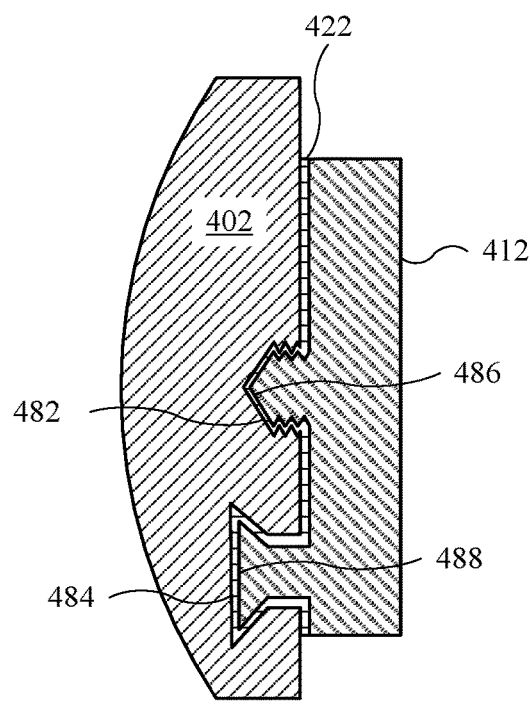
FIG. 17 illustrates a cross sectional view of the band subsequent to the molding operation, showing the filler compound interlocked with the band, in accordance with some described embodiments.

FIG. 17 illustrates a cross sectional view of the band subsequent to the molding operation, showing the filler compound 412 interlocked with the band 402, in accordance with some described embodiments. As shown, a sealing compound 422 is disposed between the band 402 and the filler compound 412. Also, the filler compound 412 includes a first extension 486 that extends into the first recess 482, with the first extension 486 at least partially taking on a corresponding shape as that of the first recess 482, thereby defining a first mechanical interlock between the band 402 and the filler compound 412. The filler compound 412 includes a second extension 488 that extends into the second recess 484, with the second extension 488 at least partially taking on a corresponding shape as that of the second recess 484, thereby defining a second mechanical interlock between the band 402 and the filler compound 412.

The band 402 is shown subsequent to an infusion process (previously described) that infuses the sealing compound 422. Furthermore, the infusion process may force the sealing compound 422 into the first recess 482 and the second recess 484, such that the sealing compound 422 is infused between the first recess 482 and the first extension 486, as well as between the second recess 484 and the second extension 488.

Figure 18:
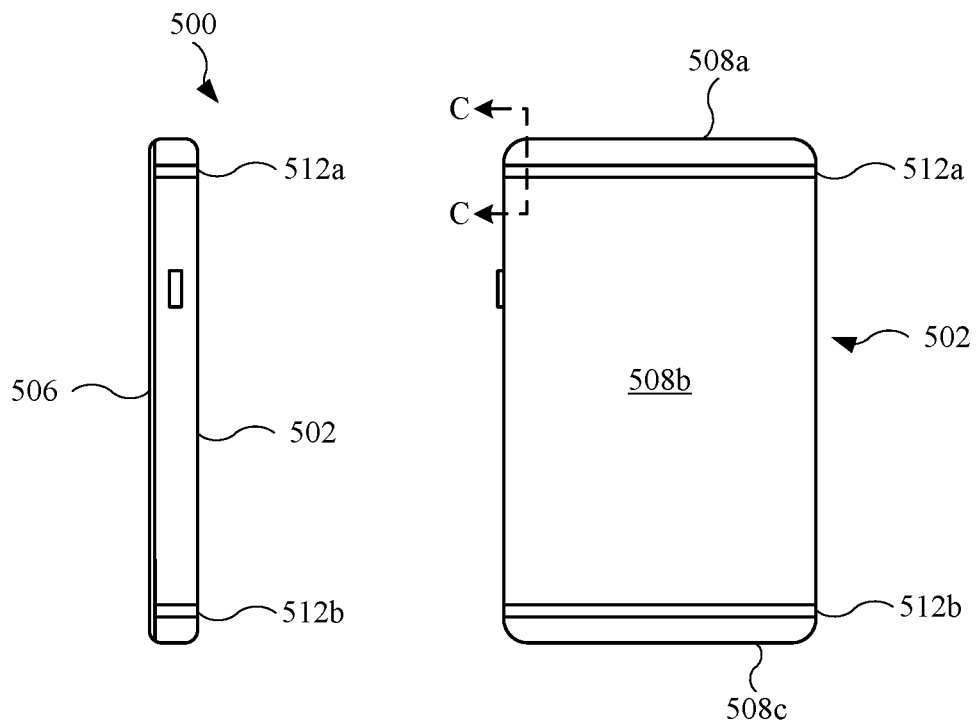
FIG. 18 illustrates an alternate embodiment of an electronic device, in accordance with some described embodiments.

FIG. 18 illustrates an alternate embodiment of an electronic device 500, in accordance with some described embodiments. In a side view, the electronic device 500 includes a housing 502, or enclosure, and a transparent protective layer 506 coupled to the housing 502. The housing 502 may include a metal (or metals) formed from steel (including stainless steel), aluminum, or a metal alloy that includes several metals, including (but not limited to) aluminum, steel, and/or nickel. The electronic device 500 may further include a display assembly (not shown in FIG. 18). Also, the electronic device 500 may further include a filler compound 512a and a filler compound 512b designed to provide a non-metal portion of the housing 502 to facilitate RF communication.

In a rear view of the electronic device 500, the filler compound 512a and the filler compound 512b extend along the width of the housing 502 to increase the available RF communication pathway through the housing 502. The filler compound 512a may split the housing 502 into a housing component 508a and a housing component 508b that is separate from the housing component 508a, while the filler compound 512b may split the housing 502 into a housing component 508c that is separate from the housing component 508b.

Figure 19:
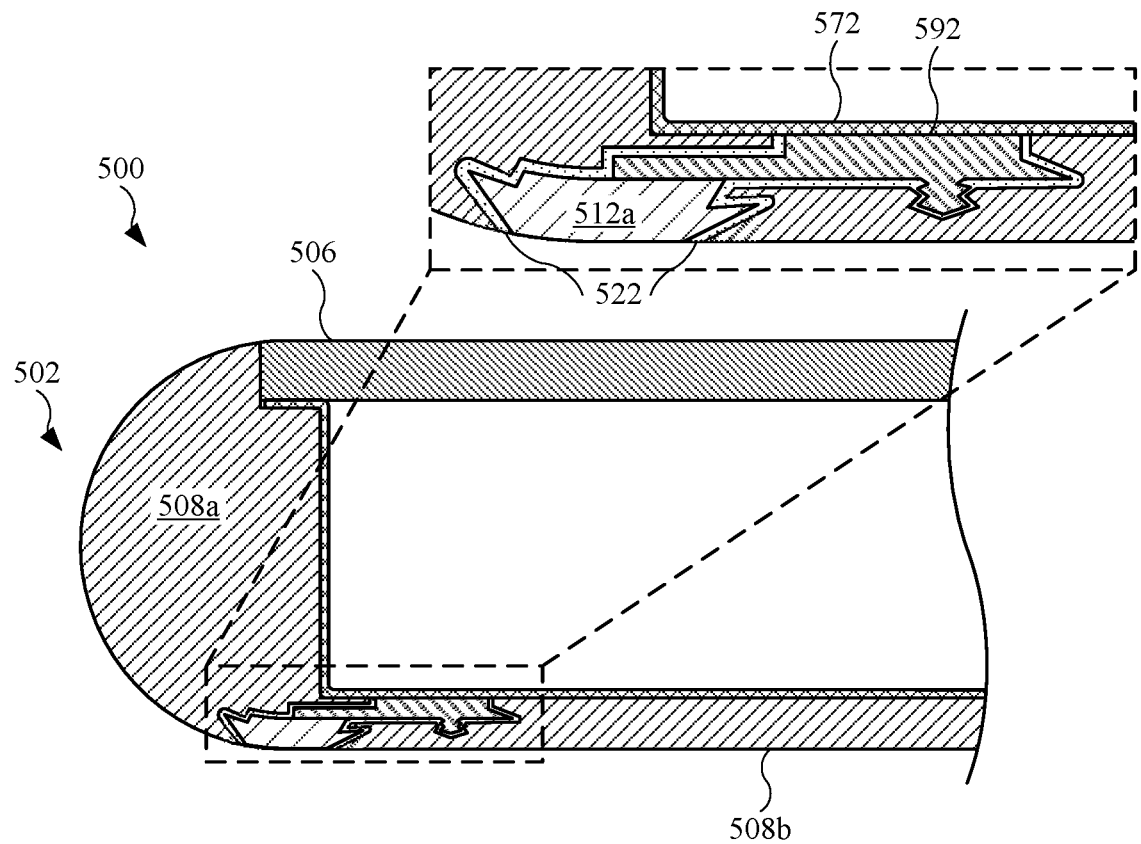
FIG. 19 illustrates a cross sectional view of the electronic device shown in FIG. 18, taken along line C-C, showing multiple filler compounds surrounded by a sealing compound, in accordance with some described embodiments.

FIG. 19 illustrates a cross sectional view of the electronic device 500 shown in FIG. 18, taken along line C-C, showing multiple filler compounds surrounded by a sealing compound 522, in accordance with some described embodiments. As shown, the filler compound 512a is coupled to a second filler compound 592. The second filler compound 592 may include a resin or the rigid non-metal. In this manner, the filler compound 512a combines with the second filler compound 592 to provide an RF transmissive portion of the housing 502. Also, a sealing compound 522 can be infused into the housing 502 between the housing component 508a and the combination of the filler compound 512a and the second filler compound 592. The sealing compound 522 can also be infused into the housing 502 between the housing component 508b and the combination of the filler compound 512a and the second filler compound 592. Although not shown, the sealing compound 522 may be infused between the filler compound 512a and the second filler compound 592.

Furthermore, a coating 572 can be applied to the housing 502 to cover the housing component 508a, the sealing compound 522, the second filler compound 592, and the housing component 508b. Although not shown, the filler compound 512b (shown in FIG. 18) may combine with a second filler compound coupled to the filler compound 512b, and the coating 572 may cover the housing component 508c as well as the second filler compound that is coupled to the filler compound 512b.

Figure 20:
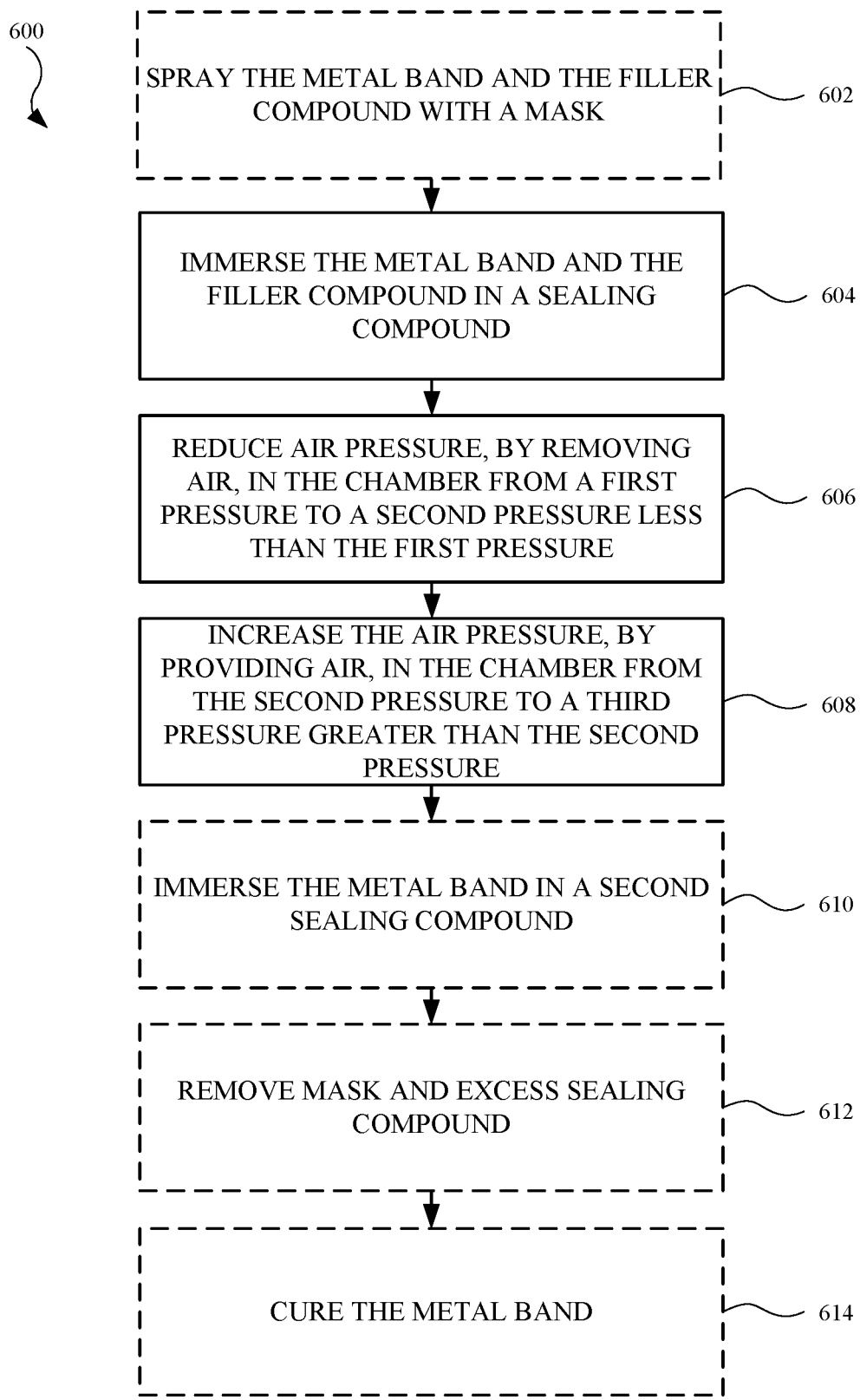
FIG. 20 illustrates a flowchart showing a method for assembling a portable electronic device, in accordance with some described embodiments.

FIG. 20 illustrates a flowchart 600 showing a method for assembling a portable electronic device, in accordance with some described embodiments. The portable electronic device may include a metal band and a filler compound. The electronic devices and bands described herein may undergo one or processes shown and described in the flowchart 600.

In an optional step 602, the metal band and the filler compound are sprayed with a mask. The mask can facilitate the removing and/or cleaning of an excess sealing compound (acting as residue). In some instances, the metal band and the filler compound are immersed in a coating that forms a mask, rather than receiving a spray.

In step 604, the metal band and the filler compound are immersed in a sealing compound. The sealing compound, along with the metal band and the filler compound, can be in a chamber. The sealing compound is in liquid form at room temperature (approximately 20-25 degrees Celsius). The sealing compound may include several materials. For example, the sealing compound may include a water-based adhesive that includes glue and/or a polymer material(s) combined with water. The sealing compound may further include an acrylic polymer suspension. Also, in some embodiments, the sealing compound includes one or more surfactants designed to lower the surface tension of the sealing compound, which may facilitate the infusion of the sealing compound into the metal band. The sealing compound may further include epoxy, silicone, and/or organic materials.

In step 606, air is removed from the chamber to reduce air pressure in the chamber from a first pressure to a second pressure less than the first pressure. A vacuum can be used to remove air from the chamber. In some instances, air is removed from the chamber to subject the metal band to an air pressure of 0.1 bar for 25 minutes. However, other pressures and times are possible. It should be noted that the air pressure should not be reduced to a pressure that causes cavitation within the metal band. When the air pressure is reduced to the second pressure, entrained air in a gap between the metal band and the filler compound can be expelled. In this manner, the volume in the gap occupied by the air is removed, or at least substantially removed.

In step 608, air is provided to the chamber to increase the air pressure in the chamber from the second pressure to a third pressure greater than the second pressure. An air supply (such as compressed air) can be used to provide air into the chamber to increase the air pressure. In some instances, air is supplied to the chamber can subject the metal band to an air pressure of 6 bar for 25 minutes. However, other pressures and time intervals are possible.

The third pressure can provide a force that causes the sealing compound to infuse into the gap between the metal band and the filler compound. As a result, the sealing compound is infused into the metal band and the metal band includes a seal against liquid ingress in locations associated with the gap.

Several optional steps are possible. For example, in step 610, the metal band is immersed into a second sealing compound. The second sealing compound may include a diluted version of the initial sealing compound (described above in step 604). The second sealing compound is designed to at least partially remove the initial sealing compound that is unwanted. For example, any initial sealing compound on an outer surface of the metal band may be referred to as residue that is unwanted. Also, the metal band may further be placed in a chamber that includes water to further remove the initial sealing compound that is excess or unwanted.

In step 612, the mask and excess sealing compound can be removed. Step 612 is performed if the metal band and the filler compound are sprayed with a mask, in step 602.

In step 614, the metal band is cured. The curing operation may include a heating unit that applies heat to solidify the initial sealing compound. The heating unit may apply heat at a temperature approximately in the range of 50 to 70 degrees Celsius for an hour. However, other temperatures and time intervals are possible.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device, comprising:
   a wall;
   a set of metal sidewall components defining an opening, the set of metal sidewall components and the wall surrounding and defining an internal volume;
   a filler compound positioned in the opening, the filler compound comprising a non-metal material, the filler compound and the set of metal sidewall components defining a gap; and a sealing compound infused into the gap, the sealing compound forming a barrier that prevents a liquid from entering the internal volume through the gap from an external environment.

2. The portable electronic device of claim 1, further comprising a coating that covers the set of metal sidewall components, the filler compound, and the wall.

3. The portable electronic device of claim 1, wherein the wall comprises a transparent protective layer.

4. The portable electronic device of claim 1, further comprising a transparent protective layer that is coupled with the set of metal sidewall components, wherein:
the set of metal sidewall components and the filler compound define a platform, and
the transparent protective layer is seated over the platform.

5. The portable electronic device of claim 1, further comprising a wireless component positioned in the internal volume, wherein the wireless component is configured to transmit and receive radio frequency communication through the filler compound.

6. The portable electronic device of claim 1, wherein the sealing compound comprises an adhesive suspension.

7. The portable electronic device of claim 1, further comprising a display assembly coupled to the set of metal sidewall components.

8. A portable electronic device, comprising:
a metal band comprising a first surface and a second surface opposite the first surface, the metal band surrounding and defining an opening;
a transparent protective layer coupled to the metal band to define an internal volume;
a filler compound positioned in the opening, the filler compound and the metal band defining a gap; and
a sealing compound disposed within the gap, the sealing compound extending from the first surface to the second surface, the sealing compound forming a barrier that prevents a liquid from entering the internal volume through the gap from an external environment.

9. The portable electronic device of claim 8, wherein the metal band comprises:
a first sidewall component; and
a second sidewall component separated from the first sidewall component by the opening.

10. The portable electronic device of claim 8, wherein;
the metal band forms a recess,
the filler compound is interlocked with the metal band at the recess, and
the sealing compound is positioned in the recess.

11. The portable electronic device of claim 8, further comprising a coating that covers the metal band, the transparent protective layer, the filler compound, and the sealing compound.

12. The portable electronic device of claim 11, wherein the coating comprises-a polyurethane.

13. The portable electronic device of claim 8, wherein the sealing compound comprises an adhesive suspension that bonds to the metal band and the filler compound.

14. A method for assembling a portable electronic device, the portable electronic device comprising a metal band and a filler compound, the method comprising:
immersing the metal band and the filler compound in a sealing compound disposed in a chamber, the metal band surrounding and defining an opening and the filler compound positioned at the opening, the metal band and the filler compound defining a gap;
reducing air pressure in the chamber from a first pressure to a second pressure less than the first pressure by removing air, wherein reducing the air pressure to the second pressure expels air from the gap;
increasing the air pressure in the chamber from the second pressure to a third pressure greater than the second pressure by providing air, wherein increasing the air pressure to the third pressure causes the sealing compound to infuse into the gap to define a barrier that prevents liquid from passing through the gap from an external environment.

15. The method of claim 14, further comprising curing the sealing compound by providing heat.

16. The method of claim 14, wherein the sealing compound comprises an adhesive suspension.

17. The method of claim 14, further comprising removing the sealing compound from an outer surface of the metal band.

18. The method of claim 14, further comprising molding the filler compound to the metal band.

19. The method of claim 18, further comprising molding the filler compound into a recess of the metal band to interlock the filler compound with the metal band.

* * * * *